Figure 9:
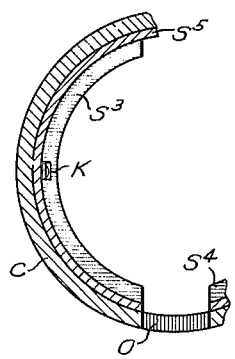

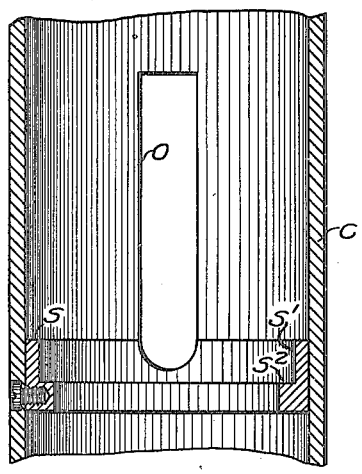
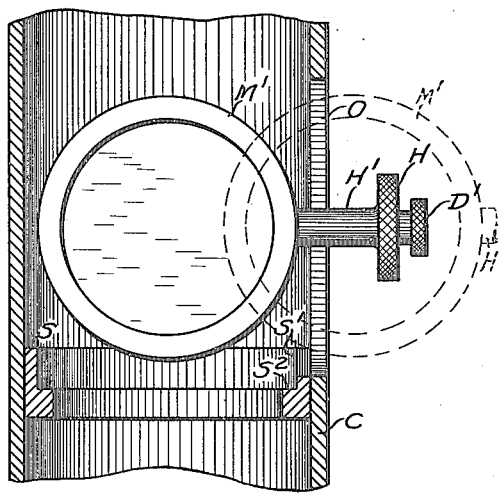
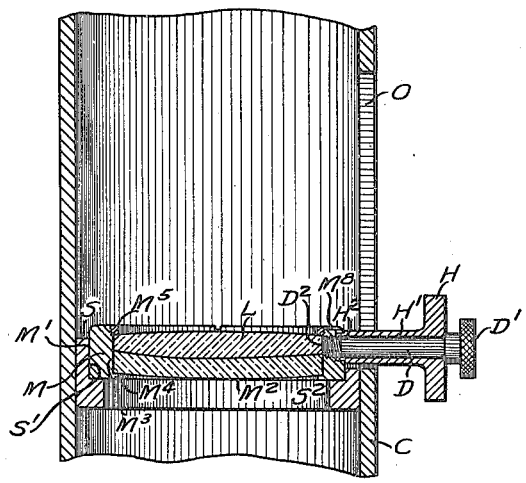
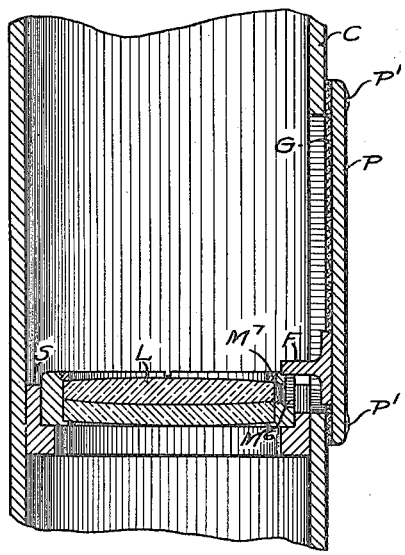
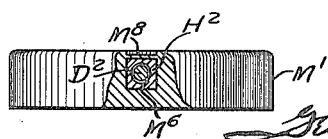

G. N. SAEGMULLER.
PERISCOPE CONSTRUCTION.
APPLICATION FILED APR. 17, 1916.

1,198,157.

Patented Sept. 12, 1916.
2 SHEETS—SHEET 2.

INVENTOR.
George N. Saegmuller
BY
Church & Rich
his ATTORNEYS

UNITED STATES PATENT OFFICE.

GEORGE N. SAEGMULLER, OF ROCHESTER, NEW YORK, ASSIGNOR TO BAUSCH & LOMB OPTICAL COMPANY, OF ROCHESTER, NEW YORK, A CORPORATION OF NEW YORK.

PERISCOPE CONSTRUCTION.

1,198,157.  Specification of Letters Patent.  Patented Sept. 12, 1916.

Application filed April 17, 1916. Serial No. 91,525.

*To all whom it may concern:*

Be it known that I, GEORGE N. SAEGMULLER, a citizen of the United States, residing at Rochester, in the county of Monroe, State of New York, have invented certain new and useful Improvements in Periscope Construction; and I do declare the following to be a full, clear, and exact description of the same, reference being had to the accompanying drawings, forming a part of this specification, and to the figures and letters of reference marked thereon.

My invention relates to optical instruments employing a casing or support in which optical elements are mounted.

More particularly my invention relates to the construction of telescopes or periscopes.

The surface of optical elements such as the lenses and prisms employed in a telescope system, even though inclosed in a casing, are liable to become clouded and therefore from time to time require cleaning. The modern periscope serves as a good example. This instrument comprises a long tubular body, usually held in an upright position and provided at its upper end with an objective head and at its lower end with an ocular head. The optical elements both in the objective head and in the ocular head are usually few in number and are readily accessible after removing the respective head. In the tubular body however, the optical elements contained therein consisting mostly, if not entirely, of lenses of comparatively large diameter with respect to the tubular body, are exceedingly inaccessible. The cleaning of one of these elements usually involves dismembering the entire instrument. This operation is sufficiently troublesome at any time and when it is necessary to clean the lenses on board a ship at sea, it is a particularly difficult task. Where a periscope is mounted on a submarine, cleaning the optical elements contained within the tubular body at sea, is practically an impossibility.

The object of my invention is to provide a construction for the frame or tubular body of an optical instrument, to provide a form of mounting for optical elements, especially lenses, and to provide sundry coöperating devices all tending to facilitate the cleaning of optical elements mounted within the body of an optical instrument without weakening or otherwise impairing the construction of the instrument.

To these and other ends my invention consists in the apparatus hereinafter described in the combination of elements and in the arrangement of parts all hereinafter described and more particularly pointed out in the appended claims.

Figure 6:
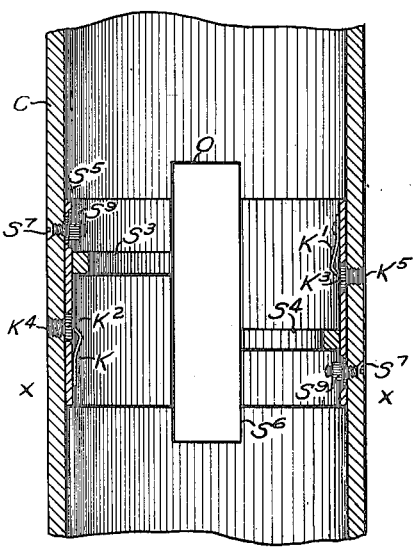
Figure 10:
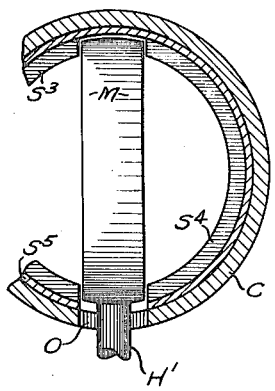
Figure 7:
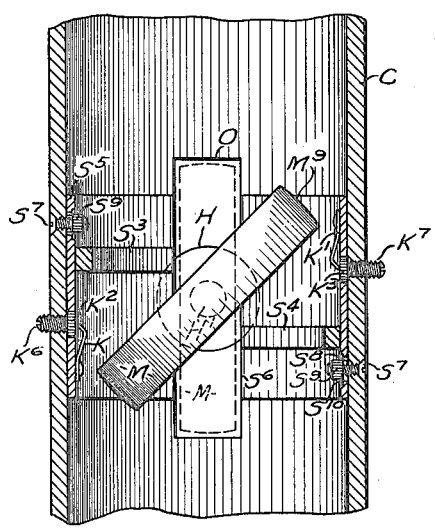
Figure 8:
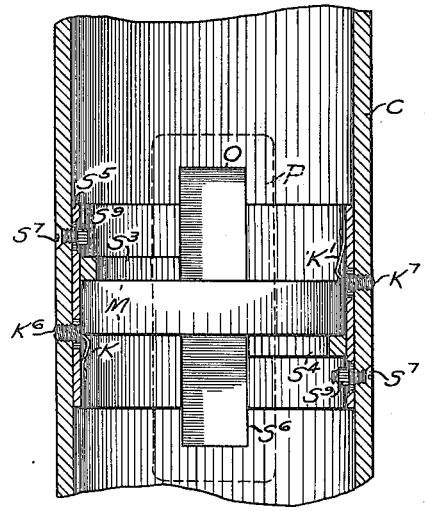

In the drawings: Figure 1 is a vertical section of a fragmentary portion of a periscope tube embodying features of my invention. Fig. 2 is a vertical section of that portion of the periscope tube shown in Fig. 1, taken however, in a plane at right angles to that in which the section shown in Fig. 1 is taken and showing a step in inserting the mounted lens into, or removing the mounted lens from its seat in the periscope. Fig. 3 is a vertical section similar to Fig. 2 excepting that the lens, lens mounting and its handle are shown with the tube in vertical section, and the lens mounting is shown in place in its seat. Fig. 4 is a vertical section similar to Fig. 3 showing the handle removed from the lens mounting, the closure plate applied to the opening through the casing and showing the means for retaining the mounting in its seat. Fig. 5 is a side elevation of the lens mounting looking from the right of Fig. 3 and broken away in the plane of the engaging portion of the handle to illustrate the manner of engaging the mounting with the handle. Fig. 6 is a vertical section of a periscope tube embodying a modified form of my invention. Fig. 7 is a view similar to Fig. 6, showing steps in the inserting or removing of a mounted lens. Fig. 8 is another view similar to Figs. 6 and 7, showing the mounted lens in position. Figs. 9 and 10 are complementary fragmentary sectional views taken on the line X—X of Fig. 6, the latter figure including the mounted lens in one of the positions which it assumes during the act of inserting it into the instrument.

Like characters of reference throughout the various figures of the drawings indicate the same parts.

My invention consists generally, in providing within the casing of an optical instrument, means for seating a lens or other optical element within the casing in a transverse plane and in providing in the vicinity of said means an elongated aperture arranged with its greater axis extending in the direction of the length of the casing: whereby the lens may be inserted through the said aperture into the casing, with a diametral plane of said lens extending in a longitudinal direction with respect to the casing and, turning said lens about a diametral axis within the casing the lens may be lodged or seated within the casing with its diametral plane extending transversely, with relation to the casing. To this end, in the embodiment of my invention shown in the drawings, I provide, within the tubular periscope casing C, a transversely arranged annular seat ring S, having the circular lens receiving recess S′ intersecting which is a shoulder S², the surfaces S′ and S² coöperating to form a seat for the lens mounting M. The seat ring S may be secured in place in the inside of the casing C either adjustably or fixedly as the case requires. While I may prefer to mount the seat ring S within the casing C in such a manner that said seat ring S is adjustable in the direction of the axis of the casing C, for simplicity sake I have shown the seat ring S rigidly mounted within the casing C, this being for many cases a perfectly practical and a highly desirable construction, since the seat S can be located and adjusted when the instrument is originally assembled, which adjustment it will thereafter maintain. In the vicinity of the seat ring S, I provide in the casing C an elongated opening or aperture O which is somewhat longer and somewhat wider than the diameter and thickness respectively of the mounting M, and which is formed with its longitudinal axis extending in the direction of the longitudinal axis of the casing C. The lower portion of the opening O it will be observed, may transect the seat ring S as is well shown in Fig. 1.

The lens mounting M comprises a ring having a circular recess M³ within which the lens L is mounted and which is provided with the lens seating shoulder M⁴ against which the lens L is held by a retaining ring M⁵. The periphery M′ and the face M² of the mounting M are adapted to engage the surfaces S′ and S² respectively of the seating ring. The mounting M and the lens L just described, is adapted to be introduced into the casing C through the opening O and placed in position on the seat ring S.

For facilitating the inserting and removing of the mounted lens L a handle H, adapted to be attached to and removed from the mounting M is provided. While a simple stud such as D, having a threaded end D² which may be screwed into the internally threaded hole M⁷ in the mounting, may be employed for a handle, such a handle, even if locked in place by a check nut, is liable to become loosened in manipulating the mounted lens. Therefore, I prefer to use a handle member adapted to be secured to the mounting by a stud passing therethrough and to provide coöperating elements on the handle and mounting which are adapted to engage one another to prevent rotative movement of the handle with relation to the mounting. To this end, in the present embodiment of my invention, I employ a handle member comprising a knurled head H and a stem H′ having a square slabbed end H² adapted to loosely fit the square recess M⁶ in the mounting M formed at the outer end of the threaded hole M⁷. This handle member is secured to the mounting by the stud D which passes through the handle member and is provided at its outer end with a knurled head D′ and at its inner end with a threaded portion D². The resulting handle is easily attached by inserting the squared end H² of the stem H′ into the recess M⁶ and the threaded end D² of the stud D into the threaded hole M⁷, which may be simultaneously accomplished, and on screwing up the stud, the handle is secured to the mounting. The removal of this handle requires only that the stud D be unscrewed when the handle may be withdrawn.

In order to introduce a lens into the casing of an optical instrument in accordance with and by means of my invention: I attach the handle above described, to the mounted lens and, grasping the lens by the handle, thrust the lens and its mounting through the aperture O into the casing C as shown in Fig. 2. I next manipulate the handle to rotate the lens and its mounting about a diametral axis of the lens that is substantially parallel to the axis of the handle, a distance of about 90° or until the lens and its mounting are arranged transversely across the casing in position to be placed in its seat. By means of the handle H then place the lens mounting within its seat as shown in Fig. 3. I now detach the handle from the mounting, secure the mounted lens on or within its seat as the case may be, and apply a closure to the aperture O. In carrying out this portion of my invention I prefer, in the present embodiment, to employ a lens seat ring arranged as shown and having the recess S′ closely fitting the periphery M′ of the lens mounting. The result is that axial alinement of the lens is assured and it is only necessary to hold the lens mounting upon the surface S² of the seat ring at one point. I then provide a notch M⁸ in the upper surface of the lens mount as shown in Figs. 3, 4, and 5, which notch is preferably in line with the threaded end D², and after introducing the lens as shown in Fig. 3 with the notch M⁸ in line with the aperture O, I apply a cover plate P provided on its surface with a gasket G and a locking finger F projecting inwardly therefrom, which finger engages with the notch $M^8$ as well shown in Fig. 4. The plate P is then pressed inwardly and downwardly and secured in place by any suitable means, such as the screws P'. As thus applied the locking finger F suffices to hold the mounting M down on the seating surface $S^2$ and within the recess S', and at the same time angularly locates and prevents the rotation of the lens mounting about the axis of the lens.

In event of its being necessary to remove the lens L, the closure plate P and its locking finger F is removed, the handle is attached as shown in Fig. 3 and, after raising the lens out of its seat by means of the handle H, the lens and its mounting is turned by means of the handle about a diametral axis substantially parallel to the axis thereof as shown in Fig. 2, when the lens may be readily withdrawn from the casing. The lens L may then be cleaned or otherwise operated upon after which it may be returned to its seat and locked in place as heretofore explained.

The modified embodiment of my invention shown in Figs. 6 to 10 inclusive is a form thereof which is adapted more particularly to instruments having lenses or similar optical elements that require to be removed or changed at frequent intervals. With this end in view I provide the structure shown, wherein a lens and its mounting M may be inserted through the opening O by means of the handle H as heretofore described and then, by rotating said mounting about a diametral axis parallel to the axis of the handle, the lens and its mounting is adapted to be simultaneously seated and locked in position. In carrying out my invention in this form, I provide on the inside of the casing wall, stops such as the segmental seat ledges $S^3$ and $S^4$ which are arranged in staggered or offset relation to one another on relatively opposite sides of the casing as well shown in the drawings. The extent of offset of the seat ledges $S^3$ and $S^4$ is governed by the thickness of the lens mounting M as is clearly shown in Fig. 8 since the under face of the mounting M rests on the upper face of the ledge $S^4$ and the upper face of the said mounting bears against the under face of the ledge member $S^3$. When an offset pair of segments $S^3$ and $S^4$ are arranged as shown, within the casing of an optical instrument on the opposite sides of the aperture O and one above the other, and one or more spring catches such as K and K' are provided adjacent each of the segments and in the path of rotation of the periphery of the lens mounting M: the lens mounting M may be inserted through the opening O and by rotating this lens mounting about an axis substantially perpendicular to the plane of said opening, until it has passed the catches K and K' and has collided with the said segments $S^3$ and $S^4$, the lens mounting will simultaneously be seated and locked in position.

In the embodiment of my invention shown in Figs. 6 to 10 inclusive I prefer for convenience in assembling, to mount the offset segmental seat ledges $S^3$ and $S^4$ and the adjacent coöperating spring catches K and K' in a split sleeve $S^5$, thus providing a convenient unit adapted to be secured in place within the casing C. The outside of the sleeve $S^5$ is adapted to closely fit the interior of the casing C and the slit or opening $S^6$ in said sleeve is as wide or somewhat wider than the width of the opening O with which the slit is adapted to register when the sleeve is in place. I prefer to use a split sleeve $S^5$ having a slit $S^6$ rather than a closed tubular sleeve having an opening corresponding to the opening O, because the split sleeve adapts itself better to slight variations in the diameter of the casing and because I can thereby use a shorter sleeve. The offset segmental seats $S^3$ and $S^4$ may either be secured to the inside of the sleeve $S^5$ or may be formed integrally therewith, said segments $S^3$ and $S^4$ being arranged on opposite sides of the slit $S^6$ and offset from one another for a distance, measured from the under surface of the segment $S^3$ to the upper surface of the segment $S^4$, equal to the thickness of the lens mounting. In the path described by the periphery of the lens mounting as it is rotated from the plane of the longitudinal axis of the slit $S^6$ into engagement with the seat ledges $S^3$ and $S^4$, and at points adjacent the said ledges $S^3$ and $S^4$ respectively, I apply one or more spring catches K and K' each provided with a longer slope on that side thereof which is first engaged by the lens mounting when it approaches the seat ledges $S^3$ and $S^4$, and an abrupt slope on that side which holds the lens mounting against its coöperating seat ledge. The result is that the mounting M while approaching the seat ledges engages the long slope of the spring catches K and K' and the catches yield outwardly with very little resistance, the free ends of said catches ducking into the respective openings $K^2$ and $K^3$ in the sleeve wall $S^5$; while, when the disengaging of the lens mounting from the grip of the catches is attempted and the pressure of the lens mounting is exerted against the abrupt slope of the catches, the catches offer considerable resistance before yielding outwardly and permitting the mounting to pass. The unit consisting of the sleeve $S^5$, the seats $S^3$ and $S^4$ and the catches K and K' is held within the casing, in position with the slit $S^6$ concentric with the opening O, by means which while securing the sleeve against rotative movement will permit of a limited amount of adjustment of the unit in the direction of the longitudinal axis of the casing. This means, in the embodiment shown, consists of two or more screws S⁷ passing through the casing wall through slots S⁸ in the sleeve S⁵ and into engagement with the nuts S⁹, which nuts seat in the recesses S¹⁰ whereby they are constrained against rotative movement. A pair of screws $K^6$ and $K^7$ are threaded into the holes $K^4$ and $K^5$ which are located in the casing wall opposite the free ends of the catches K and K'. The object of the holes $K^4$ and $K^5$ and the screws $K^6$ and $K^7$ is two-fold since the holes are adapted to provide additional clearance to accommodate the free ends of the catches K and K' when they duck outwardly due to the passing of the mounting M and the screws $K^6$ and $K^7$ which form closure for the said holes are adapted to be set up against the ends of the catches K and K' respectively as shown in Fig. 8 whereby to positively hold the mounting M against the seats $S^3$ and $S^4$. Any liability that the mounting M otherwise would have of springing out of the grip, is thereby overcome. When it is desired to insert or remove the mounting the screws $K^6$ and $K^7$ are withdrawn as shown in Fig. 7 to permit the free movement of the catches. It will be observed that the periphery $M^9$ of the mounting M should be crowned, that is, formed with a spherical contour having a radius not greater than half of the inside diameter of the sleeve $S^5$ as shown in Figs. 7, 8 and 10, whereby ample clearance is provided for rotating the mounting M into and from position on the seats $S^3$ and $S^4$.

In manipulating the lens mounting in the last described embodiment, the lens mounting M is grasped by the handle H, thrust through the opening O as shown in Fig. 7 and rotated about a diametral axis parallel to the axis of the handle, past the catches K and K' and into position against the seats $S^3$ and $S^4$ as shown in Fig. 8. After this has been done, the screws $K^6$ and $K^7$ may be set up against the catches K and K', the handle H removed and a simple closure plate (as P, shown in dotted lines in Fig. 8) may be applied to cover the opening O. To remove the mounting, the closure plate P is removed and after applying the handle to the mounting and loosening the screws $K^6$ and $K^7$ as shown in Fig. 7, a sharp twist of the handle to the left as viewed in the said figure, will disengage the mounting from the catches K and K', after which the mounting may be turned to a vertical position as shown in dotted lines in Fig. 7, and withdrawn from the casing through the opening O.

By constructing an optical instrument in accordance with my invention and providing one or more elongated apertures O through the casing, one in the vicinity of each of the lens seats as heretofore explained and shown in the drawings, the lenses or other optical elements of the instrument which are mounted within the casing may be removed from their places and returned again with facility and under almost any circumstances, without sacrificing the strength or rigidity of the optical instrument.

Having thus described two preferred embodiments of my invention, what I claim and desire to secure by Letters Patent of the United States is:

1. The combination with the tube of an optical instrument having a lens seat therein and provided with a longitudinally extending aperture, of a lens adapted to be passed through the aperture into and out of operative engagement with said seat.

2. The combination with the tube of an optical instrument having a longitudinally extending aperture and a lens seat extending transversely of the tube at one end of the aperture, of a lens coöperating with the seat and adapted to be withdrawn through the aperture.

3. In an optical instrument, the combination with a tube having a longitudinal slot, of a lens adapted to be inserted through the slot and rotated into an operative position extending transversely of the tube and means coöperating with the lens for holding it in said operative position.

4. In an optical instrument, the combination with a casing having an aperture, of an optical element adapted to be introduced into the casing through the aperture and turned a partial revolution about its transverse diametral axis into a plane transverse of the casing, and supporting means for holding the optical element in its transverse position within the casing.

5. The combination with the tube of an optical instrument having a longitudinally extending aperture and a transversely extending lens seat arranged in proximity to the aperture, of a lens adapted to coöperate with the seat and means for passing the lens through the aperture with its diameter extending longitudinally of the aperture and rotating it about a diametral axis extending transversely to the plane of the aperture.

6. In an optical instrument the combination with a casing having a lens support therein and provided with a longitudinally extending aperture in the vicinity of the lens support, of a lens and a mounting therefor adapted to pass through the aperture into and out of operative engagement with said support, a handle member provided with an end adapted to engage and coöperate with a portion of the mounting to prevent rotative movement of the handle relatively to the mounting, and a screw threaded stud passing through the handle member and coöperating with the mounting to detachably secure the handle member thereto.

7. The combination with the tube of an optical instrument having a longitudinally extending aperture and a transversely extending lens seat provided with a seating recess and arranged in the vicinity of the aperture, of a lens and a mounting for the lens having a peripheral contour adapted to closely fit the seating recess, and adapted to be passed through the aperture, turned about a diametral axis and placed in position in the seating recess, a closure plate for the aperture and a finger projecting inwardly from the closure plate adapted to engage a coöperating portion of the lens mount to secure it in the lens seat.

8. In an optical instrument, the combination with a tube having a longitudinal slot and provided with a pair of seat ledges arranged on opposite sides of the slot in offset relation to one another, of a lens adapted to be inserted through the slot and rotated into engagement with the ledges and means for holding the lens in position against the ledges.

9. In an optical instrument, the combination with a tube having a longitudinal slot and a pair of seat ledges arranged within the casing on either side of the slot and in offset relation with one another, of a lens and a mounting for the lens adapted to be introduced into the casing through the aperture and turned a partial revolution about its transverse diametral axis into engagement with the seat ledges, and one or more spring catches arranged within the casing in proximity to the seat ledges and in the path described by the periphery of the lens mounting as it is turned into engagement with the seat ledges.

10. In an optical instrument the combination with a tube having a longitudinal slot and a pair of seat ledges arranged within the casing on either side of the slot and in offset relation with one another, of a lens and a mounting for the lens adapted to be introduced into the casing through the aperture and turned a partial revolution about its transverse diametral axis into engagement with the seat ledges, one or more spring catches arranged within the casing in proximity to the seat ledges and in the path described by the periphery of the lens mounting as it is turned into engagement with the seat ledges and means for positively locking the lens mounting in place against the seat ledges.

11. In an optical instrument, the combination with a tube having a longitudinally arranged slot, of a unit comprising a sleeve adapted to be placed within the tubing in the vicinity of the slot and provided with an opening adapted to register with said slot, a pair of seat ledges arranged within the sleeve on opposite sides of the slot and in staggered relation to one another, a lens and a mounting for the lens adapted to be inserted through the slot and rotated into engagement with the seat ledges, a pair of spring catches arranged in proximity to the seat ledges and in the path described by the periphery of the lens mount during its rotative movement, a screw threaded into the casing wall opposite the free end of each of the catches and adapted to be set inwardly against the spring catches, and means for securing the sleeve within the casing.

GEORGE N. SAEGMULLER.

Witnesses:
GEORGE A. PAGE,
WILLIAM G. WOODWORTH.